(12) United States Patent
Oh (10) Patent No.: US 7,932,640 B2
(45) Date of Patent: Apr. 26, 2011

(54) HIGH VOLTAGE POWER SUPPLY

(75) Inventor: Chul-woo Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/025,809

(22) Filed: Feb. 5, 2008

(65) Prior Publication Data

US 2008/0303350 A1 Dec. 11, 2008

(30) Foreign Application Priority Data

Jun. 7, 2007 (KR) ........................ 10-2007-0055714

(51) Int. Cl.
*H02J 1/00* (2006.01)
(52) U.S. Cl. .............................. 307/83; 307/42; 307/147
(58) Field of Classification Search .................... 307/83, 307/17, 42, 147; 336/232; 361/777, 794, 361/783, 760
See application file for complete search history.

(56) References Cited

U.S. PATENT DOCUMENTS 5,835,367 A * 11/1998 Pan et al. ........................ 363/61
2004/0074086 A1* 4/2004 Yamaguchi et al. ............ 29/745

* cited by examiner

*Primary Examiner* — Fritz M Fleming
(74) *Attorney, Agent, or Firm* — Staas & Halsey LLP (57) ABSTRACT

A high voltage power supply (HVPS) including first and second high voltage output controllers controlling output of a high voltage output signal; and a plurality of transformers transforming an output signal provided from the first and second high voltage output controller, disposed outside of the first and second high voltage controllers on the substrate, wherein output terminals in the secondary sides of the plurality of transformers are disposed along the edge of the substrate. Therefore, the volume of a system can be minimized by arranging circuits in each component for high voltage output in parallel, and spark and discharge can be reduced by minimizing interference between the primary sides and the secondary sides of the components for high voltage output, thereby preventing damage to a product.

19 Claims, 3 Drawing Sheets

HIGH VOLTAGE POWER SUPPLY

CROSS-REFERENCE TO RELATED APPLICATION

This application claims the benefit of Korean Patent Application No. 2007-55714 filed in the Korean Intellectual Property Office on Jun. 7, 2007, the disclosure of which is incorporated herein by reference.

BACKGROUND OF THE INVENTION

1. Field of the Invention

Aspects of the present invention relate to a high voltage power supply (HVPS) employed in an image forming apparatus, which has a small size, and improved efficiency and performance by using an optimal layout.

2. Related Art

Figure 1:
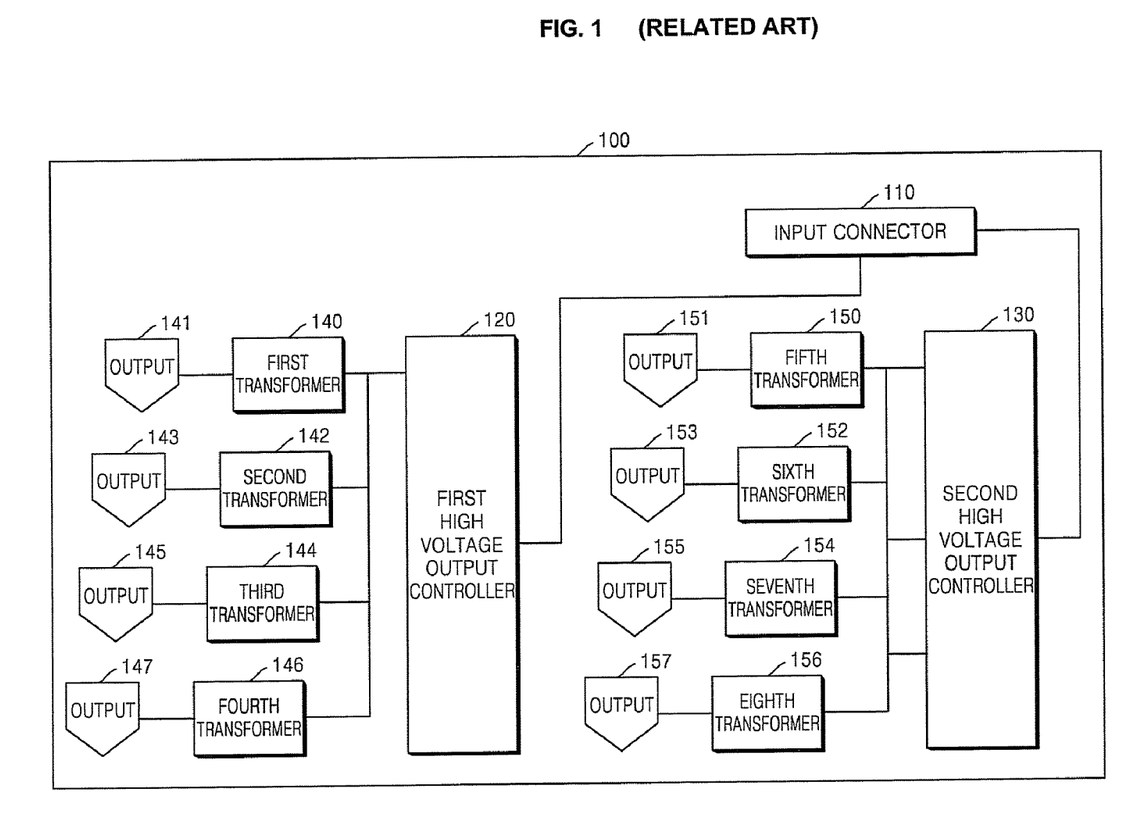
FIG. 1 is a block diagram illustrating a typical high voltage power supply (HVPS) circuit disposed on a substrate.

FIG. 1 is a block diagram of an arrangement of components on a substrate in a typical high voltage power supply (HVPS) circuit utilized in an image forming apparatus, such as a laser printer, a facsimile machine, a photocopier, and a multifunctional product. As shown in FIG. 1, the high voltage power supply (HVPS) comprises an input connector 110; first and second high voltage output controllers 120 and 130; first through eighth transformers 140, 142, 144, 146, 150, 152, 154, and 156; and output terminals 141, 143, 145, 147, 151, 153, 155, and 157, disposed on a substrate (circuit board) 100. The first high voltage output controller 120 -generates a high voltage, and is disposed in a first section of the substrate 100 closely adjacent to output terminals in secondary sides 151, 153, 155, and 157 of fifth through eighth transformers 150, 152, 154, and 156. However, because of an inappropriate disposition of the output terminals, not enough separation between output terminals is provided for the output terminals of the fifth through eighth transformers 150, 152, 154, and 156 disposed on a second section of the substrate 100. In addition, an electromagnetic effect occurs between each component, since signal lines provided from an input connector 110 are disposed in a complicated manner on and beneath the surface of the substrate 100. The larger size of the substrate 100 results in a larger image forming apparatus.

The above-described layout causes an overshoot due to the separation between the output terminals 140, 142, 144, 146, 150, 152, 154, and 156, damage to the image forming apparatus caused by an electric arc, and instability of a high voltage output from the HVPS caused by the electric arc. The size of the substrate 100 thus becomes larger and an inefficient jumper occurs. Given the micro-miniaturization trend of recent years, the large size of the substrate 100 creates a significant limitation. In particular, the separation between the components on the first section of the substrate 100 and the components on the second section of the substrate 100 second, as well as the separation between the high voltage output terminals, must be carefully calculated, since the HVPS circuit may control voltages ranging from a low voltage at 24.5 V to a high voltage, according to a predetermined number of turns. Unlike the output terminals 141, 143, 145, and 147 disposed on the first section of the substrate 100, the output terminals 151, 153, 155, and 157 disposed on the second section of the substrate 100 generate a voltage higher than 5 kV. If the separation distance is not enough and a pattern between the first high voltage output controller 120 and the second high voltage output controller 130 is arranged in a complicated manner, an abnormal operation may occur when generating an output voltage, which may cause the image forming apparatus to overheat or malfunction.

SUMMARY OF THE INVENTION

Aspects of the present invention provide a high voltage power supply (HVPS) having an optimal layout by arranging each component from an input terminal of the HVPS to a final high voltage output terminal in parallel.

Additional aspects and/or advantages of the invention will be set forth in part in the description which follows and, in part, will be obvious from the description, or may be learned by practice of the invention.

According to an aspect of the present invention, an HVPS is provided. The HVPS includes first and second high voltage output controllers disposed on a substrate to control output of a high voltage output signal; first and second plurality of transformers disposed on the substrate outside of the first and second high voltage controllers to transform the output signal provided from the first and second high voltage output controllers, respectively; and output terminals connected to secondary sides of the first and second plurality of transformers and disposed along edges of the substrate; wherein the output terminals connected to the first plurality of transformers are disposed along the edge of the substrate closest to the first plurality of transformers, and the output terminals connected to the second plurality of transformers are disposed along the edge of the substrate closest to the second plurality of transformers.

According to another aspect of the present invention, an HVPS is provided. The HVPS includes a high voltage output controller disposed on a substrate to control an output of a high voltage output signal; a plurality of transformers disposed on the substrate between an edge of the substrate and the high voltage output controller to transform output signals provided from the high voltage output controller; and output terminals connected to the secondary sides of the plurality of transformers and disposed along the edge of the substrate; wherein the high voltage output controller, the plurality of transformers, and the output terminals in the second part are disposed on the substrate in parallel, respectively.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
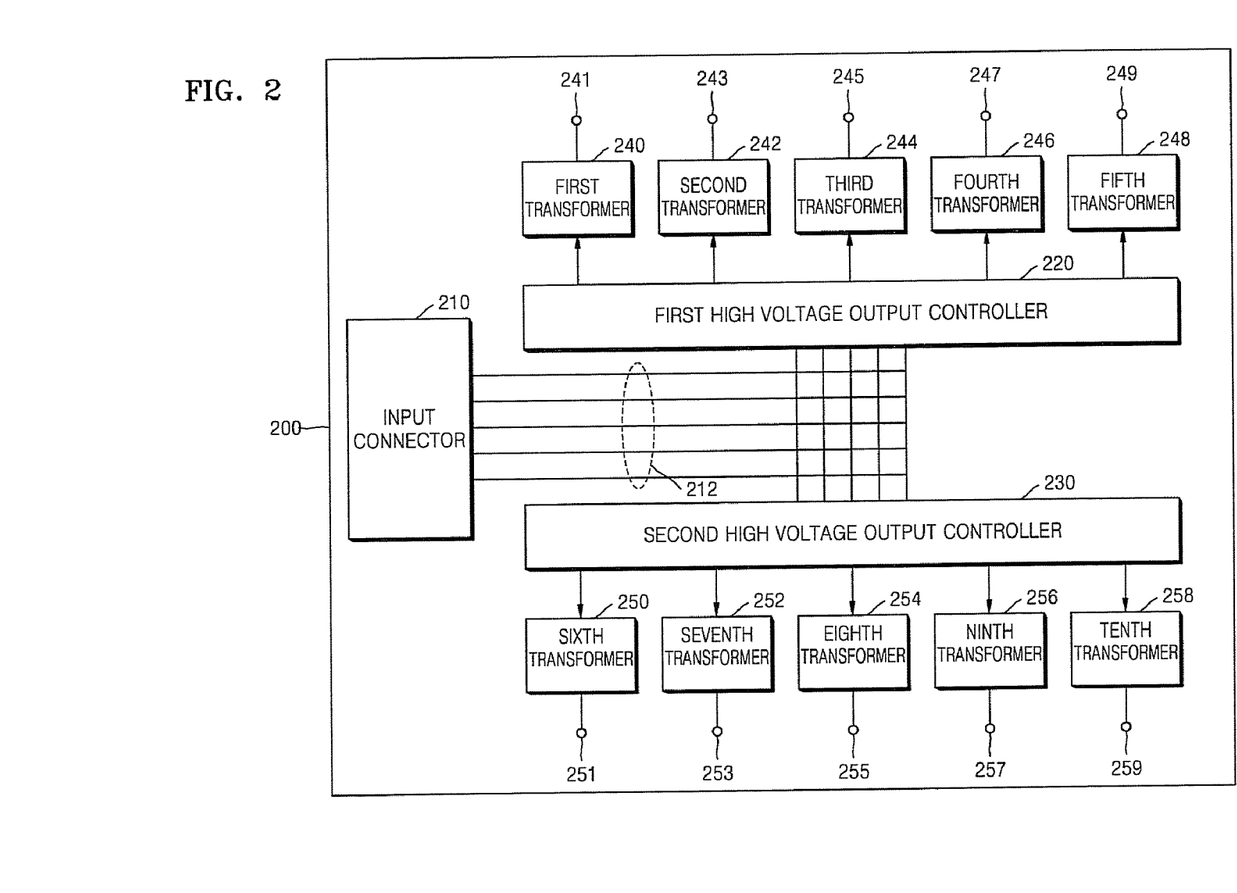
FIG. 2 is a block diagram of an HVPS circuit disposed on a substrate according to an example embodiment of the present invention.

FIG. 2 is a block diagram of an optimal layout of components of a high voltage power supply (HVPS) circuit on a substrate 200 according to an example embodiment of the present invention. As shown in FIG. 2, the optimal layout of the HPVS circuit on the substrate 200 includes an input connector 210; first and second high voltage output controllers 220 and 230; connection lines 212 connecting the input connector 210 to the first and second high voltage output controllers 220 and 230; first through tenth transformers 240, 242, 244, 246, 248, 250, 252, 254, 256, and 258; output terminals 241, 243, 245, 247, and 249 connected to secondary sides of the first through fifth transformers 240, 242, 244, 246, and 248; and output terminals 251, 253, 255, 257, and 259 connected to secondary sides of the sixth through tenth transformers 250, 252, 254, 256, and 258.

The input connector 210 provides a signal to the first and second high voltage output controllers 220 and 230. The first high voltage output controller 220 and the second high voltage output controller 230 output a high voltage output signal in order to supply a high voltage to a apparatus, such as an image forming apparatus. The first through fifth transformers 240, 242, 244, 246, and 248 transform each signal provided from the first high voltage output controller 220. Sixth through tenth transformers 250, 252, 254, 256, and 258 transform an output signal provided from the second high voltage output controller 230. Finally, the output terminals 241, 243, 245, 247, 249, 251, 253, 255, 257, and 259 provide the transformed output signals to the apparatus. The particular makeup of the components arranged on the substrate 100 is not a limiting factor; for example, any type of transformer may be used as the first through tenth transformers 240, 242, 246, 248, 250, 252, 254, 256, and 258.

The input connector 210 is disposed on one side of the substrate 200. The connection lines 212 are arranged in the middle part (a central region) of the substrate 200. As shown in FIG. 2, the first high voltage output controller 220 and the second high voltage output controller 230 are arranged on the substrate 200 so as to face each other and are separated by a predetermined distance from the middle part of the substrate 200. The first and second high voltage output controllers 220 and 230 may be arranged on a first and second section of the substrate 200, respectively, as shown in FIG. 2.

The first through fifth transformers 240, 242, 244, 246, and 248 are disposed on the substrate 200 outside of the first high voltage controller 220. Output terminals in the secondary sides 241, 243, 245, 247, and 249 of the first through fifth transformers 240, 242, 244, 246, and 248 are disposed along the edge of the substrate 200 closest to the first through fifth transformers 240, 242, 244, 246, and 248. The first through fifth transformers 240, 242, 244, 246, and 248 and their corresponding output terminals 241, 243, 245, 247, and 249 are disposed in parallel on the substrate 200, respectively. Accordingly, unlike in the typical HVPS, a distance between high voltage output controllers and output terminals can be maintained within a predetermined or greater distance, and space on the substrate 200 of the HVPS can be maximized, allowing for the use of a smaller substrate as compared to a typical substrate.

As shown in FIG. 2, the sixth through tenth transformers 250, 252, 254, 256, and 258 are disposed on the substrate 200 outside of the second high voltage controller 230. The output terminals 251, 253, 255, 257, and 259 are disposed along the edge of the substrate 200 closest to the sixth through tenth transformers 250, 252, 254, 256, and 258. The sixth through tenth transformers 250, 252, 254, 256, and 258 and their output terminals in the secondary sides 251, 253, 255, 257, and 259 are disposed in parallel on the substrate 200, respectively. Accordingly, unlike in the conventional HVPS, a distance between high voltage output controllers and output terminals can be maintained within a predetermined or greater distance, and a space in the substrate 200 of the HVPS can be maximized, allowing for the use of a smaller substrate as compared to a typical substrate.

The output terminals 241, 243, 245, 247, and 249 of the first through fifth transformers 240, 242, 244, 246, and 248 and the output terminals 251, 253, 255, 257, and 259 of the sixth through tenth transformers 250, 252, 254, 256, and 258 are disposed on the substrate 200 as far apart as possible. An electromagnetic effect is minimized when these output terminals are far apart from each other. For example, a separation distance between output terminals in the secondary sides may be greater than 2 mm when a high voltage output is 1 kV, and greater than 10 mm when a high voltage output is 5 kV.

Figure 3:
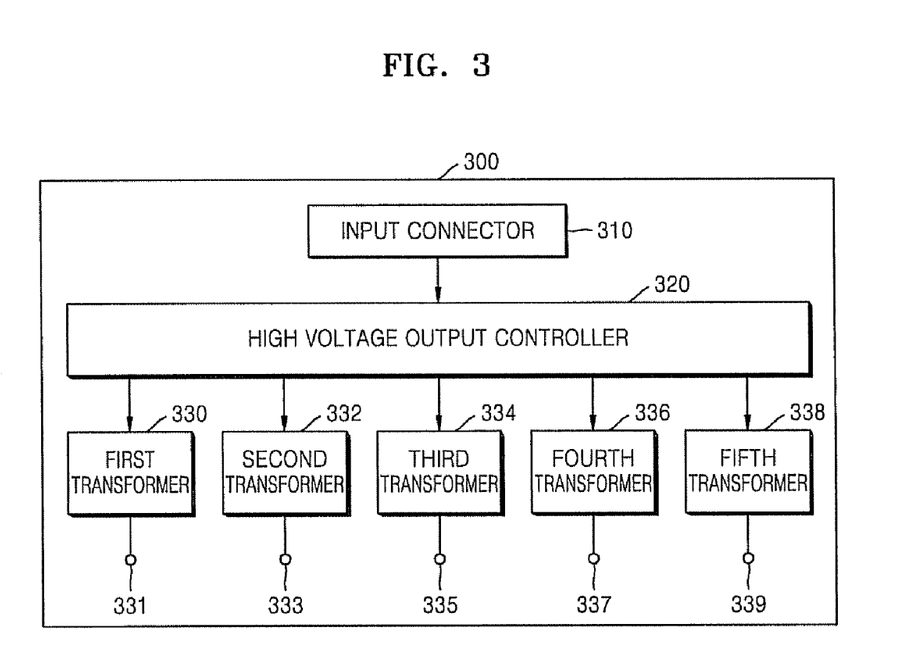
FIG. 3 is a block diagram of an HVPS circuit disposed on a substrate according to another example embodiment of the present invention.

FIG. 3 is a block diagram of an arrangement of components on a substrate in an HVPS according to another example embodiment of the present invention. An input connector 310 supplies power to a high voltage output controller 320, and is disposed at one side of a substrate 300. The high voltage output controller 320 controls output of a high voltage output signal using the power provided by the input connector 310. First through fifth transformers 330, 332, 334, 336, and 338 transform output signals controlled by the high voltage output controller 320. Output terminals 331, 333, 335, 337, and 339 are connected to the secondary sides of the first through fifth transformers 330, 332, 334, 336, and 338 to provide the transformed high voltage output signal to the apparatus.

The first through fifth transformers 330, 332, 334, 336, and 338 are disposed along an edge of the substrate 300. As shown in FIG. 3, the first through fifth transformers 330, 332, 334, 336, and 338, and output terminals 331, 333, 335, 337, and 339 are disposed in a line. The first through fifth transformers 330, 332, 334, 336, and 338, and their output terminals 331, 333, 335, 337, and 339 are disposed in parallel on the substrate 300. Accordingly, unlike in a typical HVPS, a distance between high voltage output controllers and output terminals can be maintained within a predetermined or greater distance, and a space in the substrate 300 of the HVPS can be maximized.

The output terminals 331, 333, 335, 337, and 339 of the first through fifth transformers 330, 332, 334, 336, and 338 are disposed as far apart as possible from each other. An electromagnetic effect is minimized when these output terminals are far apart from each other. For example, a separation distance between output terminals in the secondary sides may be greater than 2 mm when a high voltage output is 1 kV, and greater than 10 mm when a high voltage output is 5 kV.

An HVPS having the above-described arrangement on the substrate 300 may be used in an image forming apparatus, such as a printer, facsimile machine, copier, or a multi-functional printer.

In an HVPS according to aspects of the present invention, a volume of a system can be minimized by arranging circuits in each component for high voltage output in parallel. Sparks and discharges can be reduced by minimizing interference between the components for high voltage output, thereby preventing damage to a product.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, as discussed above, an image forming apparatus according to aspects of the present invention may include an image forming unit to form an image onto a printable medium and an HVPS to supply power to the image forming unit arranged on a substrate according to aspects of the present invention. Accordingly, it is intended, therefore, that the present invention not be limited to the various example embodiments disclosed, but that the present invention includes all embodiments falling within the scope of the appended claims.

What is claimed is:

1. An image forming apparatus comprising:
    an image forming unit to form an image onto a printable medium; and
    a high voltage power supply (HVPS) to supply power to the image forming unit, the HVPS comprising:
    a substrate having a first direction, the substrate having a first edge portion, a first peripheral portion, a central region, a second peripheral portion, and a second edge portion with respect to the first direction,
    first and second high voltage output controllers disposed on the substrate, the first high voltage output controller located closer to the first peripheral portion than the second high voltage output controller,
    a plurality of first transformers, corresponding to the first high voltage output controller, disposed on the first peripheral portion of the substrate for transforming high voltage outputs based on control signals output by the first high voltage output controller,
    a plurality of second transformers, corresponding to the second high voltage output controller, disposed on the second peripheral portion of the substrate for transforming high voltage outputs based on control signals output by the second high voltage output controller,
    a plurality of first output terminals disposed on the first edge portion and coupled to the first transformers, and
    a plurality of second output terminals disposed on the second edge portion and coupled to the second transformers.

2. The image forming apparatus of claim 1, further comprising an input connector disposed on the substrate and coupled to the first and second high voltage output controllers via connection lines,
    wherein the connection lines coupled between the input connector and the first and second high voltage output controllers are arranged so as to extend along the substrate without passing adjacent to the output terminals of the transformers.

3. The image forming apparatus of claim 1, wherein the plurality of transformers corresponding to the first high voltage output controller comprises at least three transformers to provide high voltage power to the image forming unit, the plurality of transformers corresponding to the second high voltage output controller comprises at least three transformers to provide high voltage power to the image forming unit.

4. The image forming apparatus of claim 2, wherein the connection lines coupled between the input connector and the first and second high voltage output controllers are arranged so as to extend along the substrate without passing between any two of the output terminals of the transformers.

5. The image forming apparatus of claim 1, wherein the first and second high voltage output controllers are arranged on the substrate so as to face each other and are separated by a predetermined distance from a central region of the substrate, the plurality of transformers corresponding to the first or second high voltage output controllers, and the output terminals on the secondary sides of each of the plurality of transformers are disposed in parallel, respectively, in the HVPS.

6. An image forming apparatus comprising:
    an image forming unit to form an image onto a printable medium; and
    a high voltage power supply (HVPS) to supply power to the image forming unit, the HVPS comprising:
    an input connector disposed on a substrate;
    a high voltage output controller disposed on the substrate to control an output of high voltage output signals using signals inputted through the input connector;
    a plurality of transformers disposed on the substrate to transform the output signals provided from the high voltage output controller; and
    a plurality of output terminals connected to secondary sides of the plurality of transformers, respectively,
    wherein the high voltage output controller is disposed on the substrate coupled to the input connector via connection lines,
    wherein each of the plurality of output terminals is disposed along a first edge region and a second edge region of the substrate, and
    wherein the input connector, the high voltage output controller, the plurality of transformers, and the output terminals of the transformers are disposed on the substrate such that the connection lines coupled between the input connector and the high voltage output controllers do not pass adjacent to the output terminals of the transformers.

7. The image forming apparatus of claim 6, wherein the plurality of transformers comprises at least six transformers to provide high voltage power to the image forming unit.

8. The image forming apparatus of claim 6, wherein the plurality of transformers are disposed on the substrate between an edge of the substrate and the high voltage output controller.

9. The image forming apparatus of claim 8, wherein a separation distance between output terminals in the secondary sides is greater than 2 mm when a high voltage output is 1 kV, and greater than 10 mm when a high voltage output is 5 kV.

10. A high voltage power supply (HVPS) comprising:
    a substrate;
    an input connector disposed on the substrate;
    a first high voltage output controller disposed on a first section of the substrate to control first high voltage output signals;
    a second high voltage output controller disposed on a second section of the substrate to control second high voltage output signals;

a first plurality of transformers disposed on the first section of the substrate between a first edge of the substrate and the first high voltage output controller to transform the first output signals;

a second plurality of transformers disposed on the second section of the substrate to transform the second output signals;

first output terminals connected to the secondary sides of the first plurality of transformers and arranged along the first edge of the substrate; and second output terminals connected to the secondary sides of the second plurality of transformers and arranged along the second edge of the substrate;

wherein the input connector, the first high voltage output controller, the second high voltage output controller, the first output terminals and the second output terminals are arranged on the substrate such that connection lines coupled between the input connector and the high voltage output controllers do not pass adjacent to the first output terminals and the second output terminals.

11. The HVPS of claim 10, wherein the first and second high voltage output controllers are disposed on the substrate closer to the center of the substrate than the first and second plurality of transformers.

12. The HVPS of claim 10, wherein the first and second high voltage output controller, the first and second plurality of transformers, and the first and second output terminals are disposed on the substrate in parallel.

13. The HVPS of claim 10, wherein the first and second output terminals are arranged on the substrate as far apart from one another as possible so as to minimize electromagnetic effects between each of the first and second output terminals.

14. The image forming apparatus of claim 1, wherein a separation distance between the output terminals is greater than 2 mm when a high voltage output is 1 kV, and greater than 10 mm when a high voltage output is 5 kV.

15. The HVPS of claim 10, wherein the HVPS is incorporated in an image forming apparatus.

16. The HVPS of claim 10, further comprising:
an input connector to supply power to the first and second high voltage output controllers and disposed on the substrate to one side of the first and second high voltage output controllers.

17. The HVPS of claim 10, wherein the first and second high voltage output controllers are each disposed a predetermined distance from the center of the substrate.

18. The HVPS of claim 10, further comprising first input terminals respectively between the first plurality of transformers and the first high voltage output controller and second input terminals respectively between the second plurality of transformers and the second high voltage output controller.

19. An image forming apparatus comprising:
an image forming unit to form an image onto a printable medium; and a high voltage power supply to supply power to the image forming unit and including:
a substrate having a first peripheral portion and a second peripheral portion located opposite to the first peripheral portion;
first and second high voltage output controllers disposed on the substrate for controlling output of high voltage output signals; and
an input connector coupled to the first and second high voltage output controllers via connection lines;
a plurality of transformers disposed on the substrate for transforming the high voltage output signals provided from corresponding ones of the first and second high voltage output controllers,
wherein a distance from each of the plurality of transformers corresponding to the first high voltage output controller to the first peripheral portion of the substrate is less than a distance from the first high voltage output controller to the first peripheral portion of the substrate, and a distance from each of the plurality of transformers corresponding to the second high voltage output controller to the second peripheral portion of the substrate is less than a distance from the second high voltage output controller to the second peripheral portion of the substrate, and
wherein output terminals of each of the plurality of transformers corresponding to the first high voltage output controller are disposed along the first peripheral portion of the substrate and output terminals of each of the plurality of transformers corresponding to the second high voltage output controller are disposed along the second peripheral portion of the substrate opposite the first peripheral portion of the substrate,
wherein a separation distance between any two of the output terminals, associated with a high voltage output equal to or greater than 5 kV, is greater than 10 mm,
wherein the connection lines coupled between the input connector and the first and second high voltage output controllers are arranged so as to extend along the substrate without passing adjacent to the output terminals of the transformers.

* * * * *

UNITED STATES PATENT AND TRADEMARK OFFICE
CERTIFICATE OF CORRECTION

PATENT NO.        : 7,932,640 B2
APPLICATION NO.   : 12/025809
DATED             : April 26, 2011
INVENTOR(S)       : Chul-woo Oh It is certified that error appears in the above-identified patent and that said Letters Patent is hereby corrected as shown below:

Beginning on page 7, column 5, line 27 and continuing through page 8, column 8, line 47 of the Issued Patent, please delete all of the claims in their entirety and replace them with the following:

1. An image forming apparatus comprising:
an image forming unit to form an image onto a printable medium; and
a high voltage power supply (HVPS) to supply power to the image forming unit, the HVPS comprising:
a substrate having a first direction and a second direction perpendicular to the first direction, the substrate having a first edge portion, a first peripheral portion, a central region, a second peripheral portion, and a second edge portion with respect to the first direction,
first and second high voltage output controllers disposed on the central region of the substrate, the first high voltage output controller located closer to the first peripheral portion than the second high voltage output controller, the second high voltage output controller located closer to the second peripheral portion than the first high voltage output controller,
a plurality of first transformers, corresponding to the first high voltage output controller, disposed on the first peripheral portion of the substrate for transforming high voltage outputs based on control signals output by the first high voltage output controller,
a plurality of second transformers, corresponding to the second high voltage output controller, disposed on the second peripheral portion of the substrate for transforming high voltage outputs based on control signals output by the second high voltage output controller;
a plurality of first output terminals disposed on the first edge portion and coupled to the first transformers; and Signed and Sealed this
Thirty-first Day of January, 2012

David J. Kappos
*Director of the United States Patent and Trademark Office* a plurality of second output terminals disposed on the second edge portion and coupled to the second transformers.

2. The image forming apparatus of claim 1, wherein the first and second high voltage output controllers are disposed on the substrate closer to the central region of the substrate than the plurality of first and second transformers.

3. The image forming apparatus of claim 1, wherein the plurality of transformers corresponding to the first high voltage output controller comprises at least three transformers to provide high voltage power to the image forming unit,
the plurality of transformers corresponding to the second high voltage output controller comprises at least three transformers to provide high voltage power to the image forming unit.

4. The image forming apparatus of claim 1, wherein the connection lines coupled between the input connector and the first and second high voltage output controllers are arranged so as to extend along the substrate without passing between any two of the output terminals of the transformers.

5. The image forming apparatus of claim 1, wherein a separation distance between the output terminals is greater than 2 mm when a high voltage output is 1 kV, and greater than 10 mm when a high voltage output is 5 kV.

6. The image forming apparatus of claim 1, wherein the first and second high voltage output controllers are arranged on the substrate so as to face each other and are separated by a predetermined distance from a central region of the substrate, the plurality of transformers corresponding to the first or second high voltage output controllers, and the output terminals on the secondary sides of each of the plurality of transformers are disposed in parallel, respectively, in the HVPS.

7. An image forming apparatus comprising:

an image forming unit to form an image onto a printable medium; and a high voltage power supply (HVPS) to supply power to the image forming unit, the HVPS comprising:

an input connector disposed on a substrate;

a high voltage output controller disposed on the substrate to control an output of high voltage output signals using signals inputted through the input connector;

a plurality of transformers disposed on the substrate between an edge of the substrate and the high voltage output controller to transform the output signals provided from the high voltage output controller; and a plurality of output terminals connected to secondary sides of the plurality of transformers, respectively, wherein the high voltage output controller is disposed on the substrate coupled to the input connector and via connection lines, wherein each of the plurality of output terminals is disposed along an edge region of the substrate, and wherein the input connector, the high voltage output controller, the plurality of transformers, and the output terminals of the transformers are disposed on the substrate such that the connection lines coupled between the input connector and the high voltage output controllers do not pass adjacent to the output terminals of the transformers.

8. The image forming apparatus of claim 7, wherein the plurality of transformers comprises at least six transformers to provide high voltage power to the image forming unit.

9. The image forming apparatus of claim 7, wherein the output terminals in the secondary sides are disposed as far apart as possible from each other.

10. The image forming apparatus of claim 9, wherein a separation distance between output terminals in the secondary sides is greater than 2 mm when a high voltage output is 1 kV, and greater than 10 mm when a high voltage output is 5 kV.

11. A high voltage power supply (HVPS) comprising:

a substrate;

an input connector disposed on the substrate first high voltage output controller disposed on a first section of the substrate to control first high voltage output signals;

a second high voltage output controller disposed on a second section of the substrate to control second high voltage output signals;

a first plurality of transformers disposed on the first section of the substrate between a first edge of the substrate and the first high voltage output controller to transform the first output signals;

a second plurality of transformers disposed on the second section of the substrate between a second edge of the substrate and the second high voltage output controller to transform the second output signals;

first output terminals connected to the secondary sides of the first plurality of transformers and arranged along the first edge of the substrate closest to the first plurality of transformers; and second output terminals connected to the secondary sides of the second plurality of transformers and arranged along the second edge of the substrate closest to the second plurality of transformers;

wherein the input connector, the first high voltage output controller, the second high voltage output controller, the first output terminals and the second output terminals are arranged on the substrate such that connection lines coupled between the input connector and the high voltage output controllers do not pass adjacent to the first output terminals and the second output terminals.

12. The HVPS of claim 11, wherein the first and second high voltage output controllers are disposed on the substrate closer to the center of the substrate than the first and second plurality of transformers.

13. The HVPS of claim 11, wherein the first and second high voltage output controller, the first and second plurality of transformers, and the first and second output terminals are disposed on the substrate in parallel.

14. The HVPS of claim 11, wherein the first and second output terminals are arranged on the substrate as far apart from one another as possible so as to minimize electromagnetic effects between each of the first and second output terminals.

15. The HVPS of claim 11, wherein the HVPS is incorporated in an image forming apparatus.

16. The HVPS of claim 11, wherein the input connector supplies power to the first and second high voltage output controllers and is disposed on the substrate to one side of the first and second high voltage output controllers.

17. The HVPS of claim 11, wherein the first and second high voltage output controllers are each disposed a predetermined distance from the center of the substrate.

18. An image forming apparatus comprising:
an image forming unit to form an image onto a printable medium; and
a high voltage power supply to supply power to the image forming unit and including:
a substrate having a first peripheral portion and a second peripheral portion located opposite to the first peripheral portion,
first and second high voltage output controllers disposed on the substrate for controlling output of high voltage output signals, and
an input connector coupled to the first and second high voltage output controllers via connection lines,
a plurality of transformers disposed on the substrate for transforming the high voltage output signals provided from corresponding ones of the first and second high voltage output controllers, and
wherein output terminals of each of the plurality of transformers corresponding to the first high voltage output controller are disposed along the first peripheral portion of the substrate and output terminals of each of the plurality of transformers corresponding to the second high voltage output controller are disposed along the second peripheral portion of the substrate opposite the first peripheral portion of the substrate,
wherein a separation distance between any two of the output terminals, associated with a high voltage output equal to or greater than 5 kV, is greater than 10 mm,
wherein the connection lines coupled between the input connector and the first and second high voltage output controllers are arranged so as to extend along the substrate without passing adjacent to the output terminals of the transformers.

19. The HVPS of claim 11, further comprising first input terminals respectively between the first plurality of transformers and the first high voltage output controller and second input terminals respectively between the second plurality of transformers and the second high voltage output controller.